United States Patent
Strong et al.

(10) Patent No.: US 9,784,642 B2
(45) Date of Patent: Oct. 10, 2017

(54) REDUNDANT OPTICAL FIBER SYSTEM AND METHOD FOR REMOTELY MONITORING THE CONDITION OF A PIPELINE

(75) Inventors: Andrew Strong, Romsey (GB); Gareth Lees, Southampton (GB); Roger Hampson, Wokingham (GB); Kevin Williams, Eastleigh (GB); Arthur Hartog, Martyr Worthy (GB)

(73) Assignee: OneSubsea IP UK Limited, London (GB)

( * ) Notice: Subject to any disclaimer, the term of this patent is extended or adjusted under 35 U.S.C. 154(b) by 796 days.

(21) Appl. No.: 13/119,231

(22) PCT Filed: Sep. 23, 2009

(86) PCT No.: PCT/GB2009/002269
§ 371 (c)(1),
(2), (4) Date: Jun. 16, 2011

(87) PCT Pub. No.: WO2010/034988
PCT Pub. Date: Apr. 1, 2010

(65) Prior Publication Data
US 2011/0242525 A1    Oct. 6, 2011

Related U.S. Application Data

(60) Provisional application No. 61/099,546, filed on Sep. 23, 2008.

(51) Int. Cl.
*G01N 21/55* (2014.01)
*G01M 11/08* (2006.01)
*G01M 11/00* (2006.01)

(52) U.S. Cl.
CPC ...... *G01M 11/083* (2013.01); *G01M 11/3154* (2013.01); *G01M 11/39* (2013.01)

(58) Field of Classification Search
CPC ............. G01M 11/083; G01M 11/085; G01M 11/086; G01M 11/088; G01M 11/31;
(Continued)

(56) References Cited

U.S. PATENT DOCUMENTS 4,900,126 A * 2/1990 Jackson ................... G02B 6/04
385/114
5,026,141 A 6/1991 Griffiths
(Continued)

FOREIGN PATENT DOCUMENTS

EP 0364093 4/1990
EP 1306656 5/2003
(Continued)

OTHER PUBLICATIONS

Li et al. (Recent applications of fiber optic sensors to health monitoring in civil engineering) / Engineering Structures 26 (2004) 1647-1657.*
(Continued)

*Primary Examiner* — Kara E Geisel
*Assistant Examiner* — Rufus Phillips
(74) *Attorney, Agent, or Firm* — Chamberlain Hrdlicka

(57) ABSTRACT

An optical fiber sensor system and method for monitoring a condition of a linear structure such as a pipeline is provided which is capable of providing continuous monitoring in the event of a break in the sensing optical fiber or fibers. The system includes at least one sensing fiber provided along the length of the linear structure, and first and second interrogation and laser pumping sub-systems disposed at opposite ends of the sensing fiber, each of which includes a reflectometer. The reflectometer of the first interrogation and laser pumping sub-system is connected to one end of the sensing fiber. The reflectometer of the second interrogation and laser pumping sub-system is coupled to either (i) an end of a
(Continued)

second sensing fiber provided along the length of the linear structure which is opposite from the one end of the first sensing fiber, or (ii) the opposite end of the first sensing fiber. Before any break of the sensing fiber or fibers occurs, each reflectometer redundantly monitors the condition of the linear structure over its entire length. After any such break occurs, each reflectometer will continue to receive signals up to the point of the break from opposite ends of the structure.

8 Claims, 4 Drawing Sheets

(58) Field of Classification Search
CPC ......... G01M 11/3109; G01M 11/3154; G01M 11/39; G01D 5/353; G01D 5/35354; G01D 5/35358; G01D 5/35383; G01D 5/35387; G01D 5/3539; G01D 5/35396; G01D 5/35393
USPC .............................. 385/12–13; 356/73.1, 445
See application file for complete search history.

(56) References Cited

U.S. PATENT DOCUMENTS

| | | | |
|---|---|---|---|
| 5,694,114 A | 12/1997 | Udd | |
| 5,724,126 A * | 3/1998 | Nishi et al. | 356/73.1 |
| 5,862,274 A * | 1/1999 | Reits | 385/13 |
| 5,866,898 A * | 2/1999 | Hodgson et al. | 250/227.14 |
| 7,011,453 B1 | 3/2006 | Harres | |
| 7,504,618 B2 | 3/2009 | Hartog et al. | |
| 7,586,617 B2 | 9/2009 | Hartog et al. | |
| 8,947,232 B2 | 2/2015 | Strong et al. | |
| 8,989,526 B2 | 3/2015 | Hartog et al. | |
| 9,146,165 B2 | 9/2015 | Hartog et al. | |
| 2003/0090780 A1 | 5/2003 | Sobe et al. | |
| 2005/0226614 A1 * | 10/2005 | Ogiwara et al. | 398/37 |
| 2006/0233485 A1 | 10/2006 | Allen | |

FOREIGN PATENT DOCUMENTS

| | | |
|---|---|---|
| FR | 2520114 A1 | 7/1983 |
| GB | 1497995 | 1/1978 |
| GB | 2436142 A | 9/2007 |
| WO | 2007107693 | 2/2007 |
| WO | 2007104915 | 9/2007 |

OTHER PUBLICATIONS

International Search Report & Written Opinion dated Jan. 14, 2010 for PCT application # PCT/GB2009/002269, 11 pgs.
International Preliminary Report of Patenability dated Mar. 29, 2011 for PCT application # PCT/GB2009/002269, 8 pgs.
Koshikiya, Y. et al., "Newly Developed Optical Fiber Line Testing System Employing B-Directional OTDRS for PON and In-Service Line Testing Criteria," IEICE Transactions on Communications, Communication Society, Tokyo, JP, vol. E90B, No. 10, Oct. 1, 2007, pp. 2793-2802, XP001508607 ISSN: 0916-8516.

* cited by examiner

REDUNDANT OPTICAL FIBER SYSTEM AND METHOD FOR REMOTELY MONITORING THE CONDITION OF A PIPELINE

CROSS REFERENCE TO RELATED APPLICATIONS

The invention is related to and claims the benefit of priority from U.S. Provisional Patent Application Ser. No. 61/099,546 of Strong et al., entitled "REDUNDANT CONFIGURATION OF REMOTE OPTICALLY AMPLIFIED DISTRIBUTED SENSORS," filed on Sep. 23, 2008, the entire contents of which is hereby incorporated by reference herein.

FIELD OF THE INVENTION

The present invention generally relates to methods and systems for condition monitoring of linear structures, and more particularly to a system and method employing redundant optical fiber sensor technologies for condition monitoring of pipelines, including terrestrial gas and oil pipelines, and the like.

BACKGROUND

In recent years, system and methods have been developed for monitoring of pipeline structures for a variety of conditions, including fluid leaks, ground movement, and damage through third-party interference. However, such systems and methods may fail to operate in the presence of a monitoring cable break. Accordingly, there is a need for a method and system that addresses the above and other problems with existing systems and methods for monitoring conditions of pipelines, such as terrestrial gas and oil pipelines.

SUMMARY OF THE INVENTION

The above and other needs and problems are addressed by the exemplary embodiments of the present invention, which provide a novel system and method based on Brillouin Optical Time Domain Reflectometer or Reflectometry (OTDR) and coherent Rayleigh noise (CRN) technologies for interrogation of an optical sensing cable, and incorporating remote optical amplification to achieve an unprecedented detection range of 100 km per channel. Advantageously, the exemplary system and method can be applied to the monitoring of pipeline structures, and the like, for a variety of conditions, for example, including fluid leaks, ground movement, damage through third-party interference, and the like. In addition, the exemplary system and method can continue operation even in the presence of a monitoring cable break, wherein the exemplary system and method includes novel interrogator hardware and amplification, advantageously, allowing the operation to continue under such circumstances. Thus, the exemplary system and method, advantageously, deploys fiber sensor technologies to provide information on the status of pipeline structures, and the like, enabling continuous monitoring of the status of such structures in the event of a break in a monitoring cable or sensing fiber. The exemplary system and method enables continuous surveillance along substantially 100% of a structure, such as 100% of a pipeline route or other linear asset, such as a railway, border, power cable, and the like, in the case of a complete monitoring cable break. In an exemplary embodiment, the exemplary system and method includes remote-pumping of the fiber optic amplifiers so that amplification of interrogating pulses and returning backscattered signals can be continuously maintained.

Accordingly, in an exemplary aspect of the present invention there is provided an optical fiber sensor system and method for monitoring a condition of a linear structure such as a pipeline, power cable, or railway which is capable of providing continuous monitoring in the event of a break in the sensing optical fiber. The system includes a sensing fiber provided along the length of the linear structure and including one or more fiber optic amplifier stages along its length, and first and second interrogation and laser pumping sub-systems disposed at opposite ends of the sensing fiber, each of which includes a reflectometer and pump laser fibers. The reflectometer of the first interrogation and laser pumping sub-system is connected to one end of the sensing fiber. The reflectometer of the second interrogation and laser pumping sub-system is coupled to either (i) an end of a second sensing fiber provided along the length of the linear structure which is opposite from the one end Of the first sensing fiber, or (ii) the opposite end of the first sensing fiber.

Before any break of the sensing fiber or fibers occurs, each reflectometer of the first and second interrogation and laser pumping sub-systems monitors the entire length of the sensing fiber or fibers, hence redundantly monitoring the condition of the linear structure over its entire length. After any such break occurs, each reflectometer will continue to receive signals up to the point of the break from opposite ends of the structure, such that the condition of the linear structure over its entire length continues to be monitored.

Still other aspects, features, and advantages of the present invention are readily apparent from the entire description thereof, including the figures, which illustrates a number of exemplary embodiments and implementations. The invention is also capable of other and different embodiments, and its several details can be modified in various respects, all without departing from the spirit and scope of the invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which.

DETAILED DESCRIPTION

Various embodiments and aspects of the invention will now be described in detail with reference to the accompanying figures. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited. Further, whenever a composition, a group of elements or any other expression is preceded by the transitional phrase "comprising," "including" or "containing," it is understood that it is also contemplated the same composition, the group of elements or any other expression with transitional phrases "consisting essentially of," "consisting," or "selected from the group consisting of," preceding the recitation of the composition, the elements or any other expression.

Figure 1:
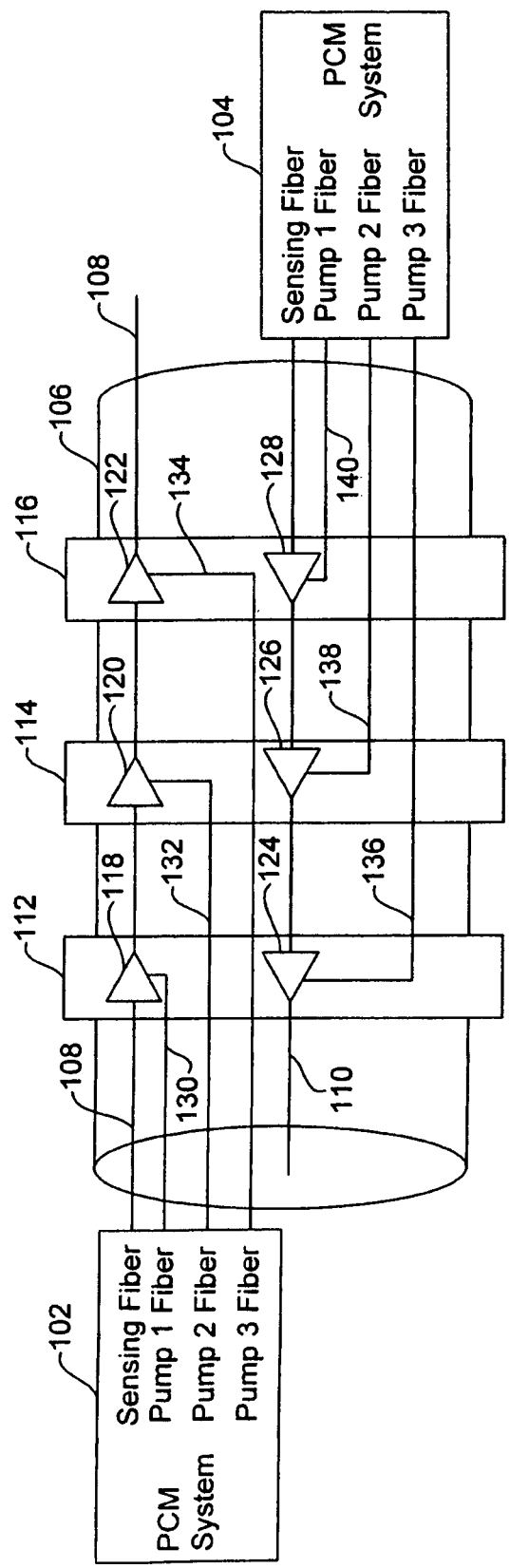
FIG. 1 schematically illustrates an exemplary optical fiber sensor system having redundant, interrogation and laser pumping sub-systems.

Referring now to the drawings, wherein like reference numerals designate identical or corresponding parts throughout the several views, and more particularly to FIG. 1 thereof, there is illustrated an exemplary optical fiber sensor system 100 having redundant interrogation and laser pumping sub-systems 102 and 104. The operation of the redundant interrogation and laser pumping sub-systems 102 and 104 is based on, for example, optical time domain reflectometry (OTDR) and coherent Rayleigh noise (CRN) techniques. Each station 102 and 104, may accordingly include a Brillouin optical time domain reflectometer and a distributed disturbance sensing interrogator. In particular, a Schlumberger DSTS "Integriti" Brillouin reflectometer is particularly suitable for use in the stations 102 and 104. Each station 102 and 104 may further include a dedicated computer processor to perform the computational load required for processing the CRN data, other computers for controlling the sub-systems and for processing other data, memories, optoelectronics, optics, crystal clocks, electronics, displays for control purposes and for generating an alarm signal to alert an operator of a breakage condition, circuitry for remotely transmitting an alarm signal, and software including test automation software and the like. Specific operational software for the stations 102 and 104 may be based on pulse-code modulation (PCM) techniques, optical time domain reflectometry (OTDR), optical frequency domain reflectometry (OFDR), or frequency modulated continuous wave (FMCW) reflectometry techniques. The sub-systems 102 and 104 are configured for respectively interrogating a sensor cable 106 (e.g., fiber optic cable, optical fiber cable, etc.) from opposite ends thereof via respective sensing fibers 108 and 110. In the case of a break at any point in the cable 106, although visibility downstream of the break may be lost, both of the systems 102 and 104 can still recognize the break and generate a remote alarm signal. Moreover, both of the systems 102 and 104 can continue monitoring the cable 106 up to the point of the break, advantageously ensuring uninterrupted monitoring of the cable 106 until such time as a repair can be made.

The system 100 further includes one or more fiber optic amplifier stages 112-116. The amplifiers stages 112-116 include respective fiber optic amplifiers 118-122 coupled to the sensing fiber 108 and the sub-system 102, and fiber optic amplifiers 124-128 coupled to the sensing fiber 110 and the sub-system 104. The sub-system 102 includes pump laser fibers 130-134 respectively coupled to the amplifiers 118-122, and the sub-system 104 includes pump laser fibers 136-140 respectively coupled to the amplifiers 124-128.

Figure 2:
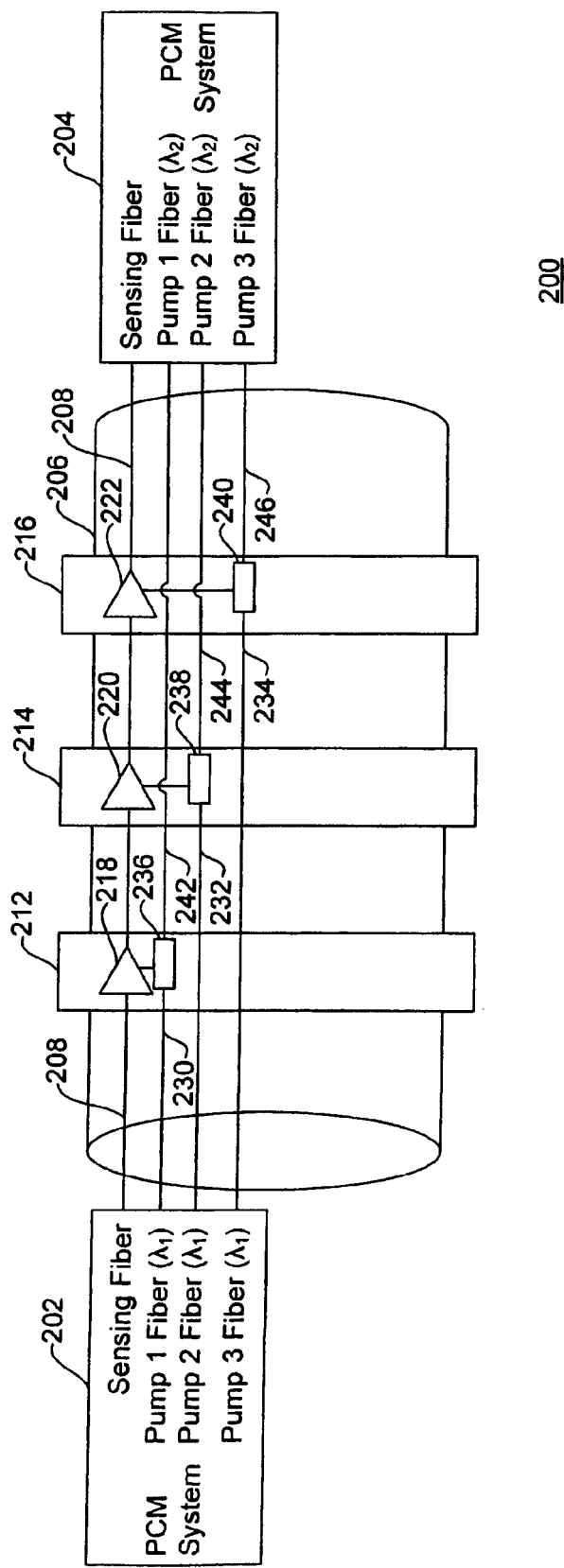
FIG. 2 schematically illustrates an exemplary optical fiber sensor system having a single interrogation sub-system and redundant laser pumping sub-systems.

FIG. 2 illustrates an exemplary optical fiber sensor system 200 (e.g., based on Brillouin Optical Time Domain Reflectometer or Reflectometry (OTDR), coherent Rayleigh noise (CRN) techniques, and the like) having a single interrogation sub-system and redundant laser pumping sub-systems. In FIG. 2, the exemplary optical fiber sensor system 200 includes a single sensing fiber 208 with redundant pumping of amplifiers 218-222 of respective amplifier stages 212-216 from respective pump laser fibers 230-234 and 242-246 installed at either end of a sensor cable 206 in respective sub-systems 202 and 204 (e.g., including computer processors, memories, optoelectronics, optics, crystal clocks, electronics, displays, software, including test automation software, and the like, and based on Pulse-Code Modulation techniques, and the like). Respective fiber optic couplers 236-240 are provided between the sub-systems 202 and 204 for redirecting the signals on the pump laser fibers 230-234 and 242-246 into the respective amplifiers 218-222.

Figure 4:
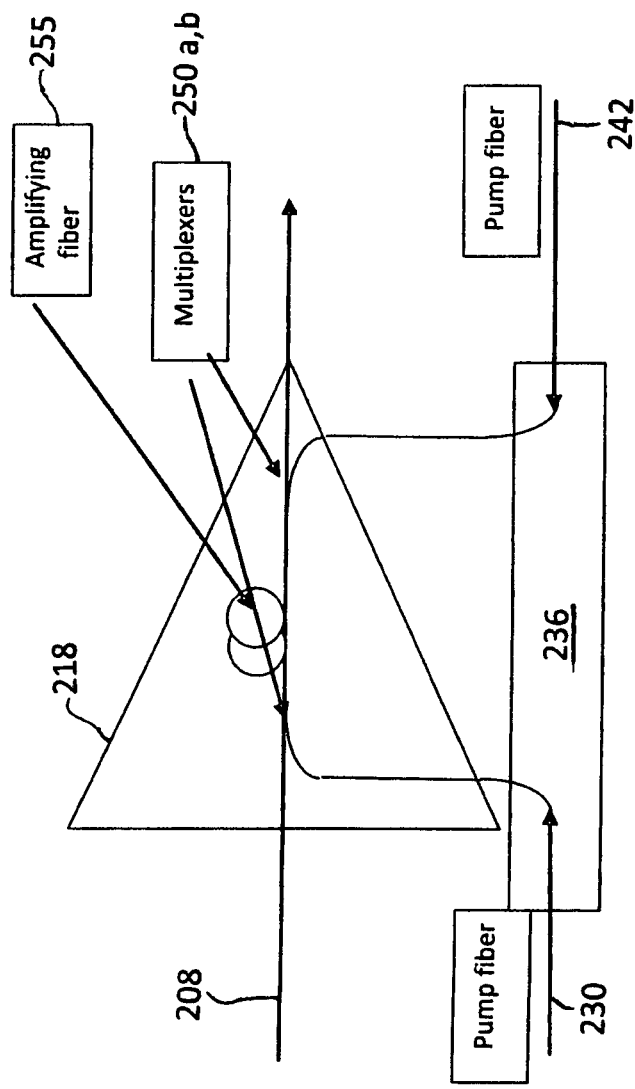
FIG. 4 is a more detailed schematic illustration of one of the optical amplifiers used in the optical fiber sensor system shown in FIG. 2.

FIG. 4 illustrates how light conducted to the amplifier 218 via the coupler 236 is processed, and is exemplary of how all of the amplifiers 218-222 processes the light received from the pump laser fibers 230-234 and 242-246. As is illustrated in FIG. 4, the fibers 230 and 242 are each optically coupled to a multiplexer 250 a, b, respectively. The multiplexers 250 a, b multiplex the outputs of the fibers 230 and 242 into the amplifying fiber 255. Such a configuration allows light from one end of the pump fiber to co-propagate with the interrogating pulse while light from the other end of the pump fiber counter-propagates against the interrogating pulse. The amplifying fiber 255 may be rare earth doped, for example erbium doped for operation at 1530-1610 nm.

The exemplary system 200 has the additional benefit that optical power levels in the pump laser fibers 230-234 and 242-246 can be reduced during normal operation, wherein the respective amplifiers 218-222 can be powered by their nearest respective pump laser fibers 230-234 and 242-246 of the sub-systems 202 and 204. The exemplary system 200 of FIG. 2 otherwise operates in a similar fashion as the exemplary system 100 of FIG. 1 and can be used in combination therewith and with further common details of operation omitted for the sake of brevity.

Figure 3:
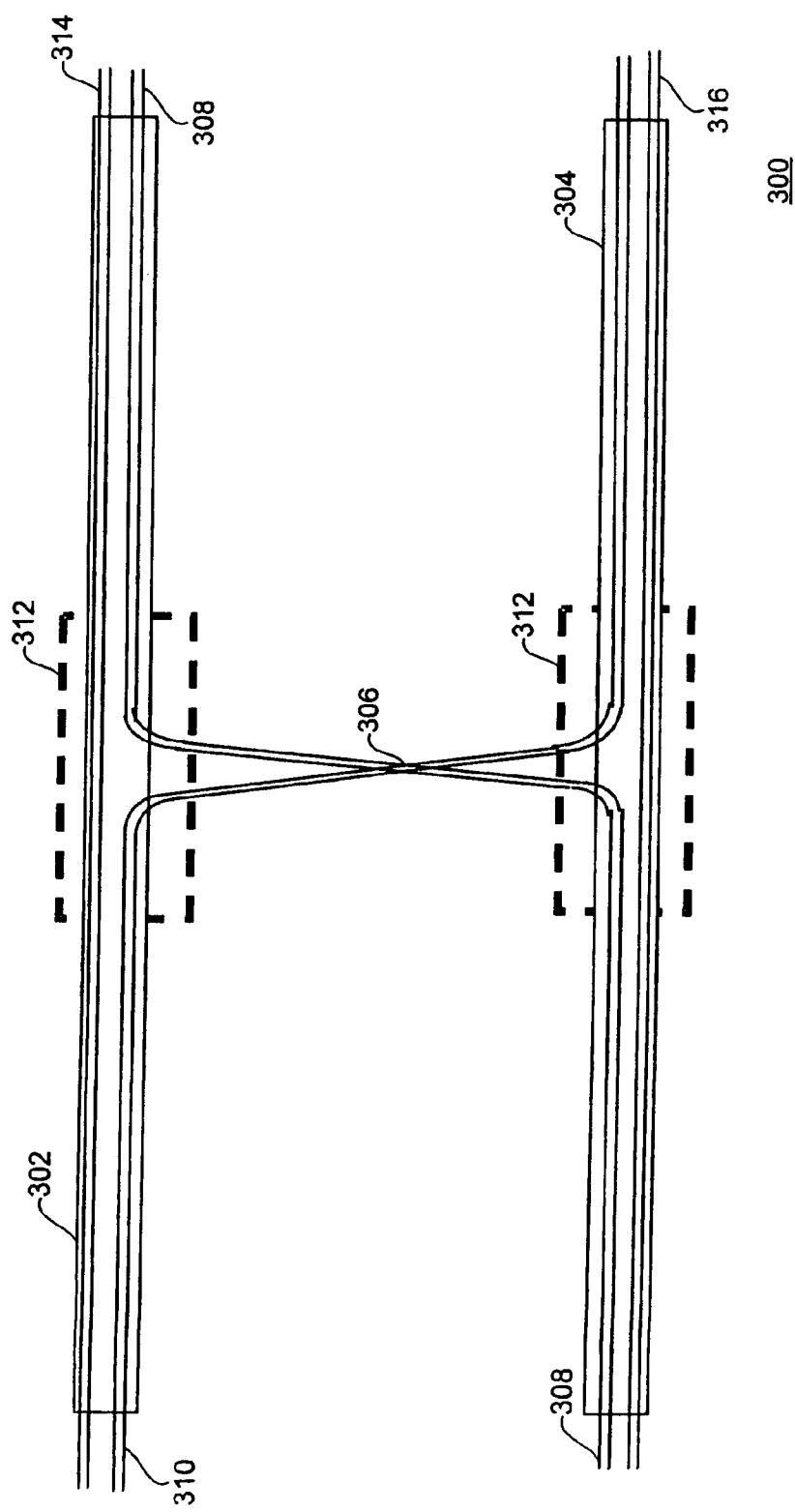
FIG. 3 schematically illustrates an exemplary optical fiber sensor system having a higher redundancy level for environments where aggressive tampering is expected and that can be used with the exemplary optical fiber sensor systems of FIGS. 1-2.

FIG. 3 illustrates an exemplary optical fiber sensor system 300 having a higher redundancy level for environments where aggressive tampering is expected and that can be used with the exemplary optical fiber sensor systems of FIGS. 1-2. In FIG. 3, the exemplary system 300 can include a plurality of cables 302 and 304 and at least one cross-over 306 of one or more of optical sensing fibers 308 and 310 between the cables 302 and 304, advantageously, allowing the overall system to be more resilient to cutting or other vandalism by people determined to interfere with the asset (not shown) being protected. The cables 302 and 304 can be configured to run in parallel to the asset being protected, wherein the cables 302 and 304 can be deployed, for example, on either side of the asset, in a same trench as the asset, but with one cable much deeper than the other, and the like.

Each of the cables 302 and 304 can include more fibers than are required for the monitoring based on a single cable, advantageously, providing redundancy. At predetermined locations along the cable, for example, at locations where splice housings 312 exist, the cross-over fibers 308 and 310 are broken out from the cable 302 and spliced to fibers in the cable 304. One or more parallel optical sensing fibers 314 and 316 can be included only within the respective cables 302 and 304. The one or more crossover fibers 308 and 310 and the one or more parallel fibers 314 and 316 can be used as sensing fibers, to carry optics to drive remote optical amplifiers, to boost signals, to probe signals, as sensing fibers, and the like.

In further exemplary embodiments, more than one crossover 306 can be used along a cable route, further cables can be added, multiple cables can be combined with redundancy achieved by interrogation from both ends thereof and with feeding of laser pump power from both ends thereof, for example, as described with respect to FIGS. 1-2, and the like.

The exemplary sensor systems of FIGS. 1-3 can be installed on any suitable structures or protected assets, such pipeline structures, linear assets, including railway structures, border structures, power cable structures, and the like, as will be appreciated by those of ordinary skill in the relevant art(s).

While the inventions have been described in connection with a number of exemplary embodiments, and implementations, the inventions are not so limited, but rather cover various modifications, and equivalent arrangements, which fall within the purview of the appended claims.

What is claimed is:

1. An optical fiber sensor system for monitoring a condition of a linear structure, the system comprising:
    a sensor cable comprising first and second sensing fibers provided along the length of the linear structure and decoupled from each other,
    first and second interrogation and laser pumping sub-systems disposed at opposite ends of the sensor cable, each of which includes a reflectometer,
    the first sensing fiber being coupled only to the reflectometer of the first interrogation and laser pumping sub-system at one end such that the reflectometer of the first interrogation and laser pumping sub-system is configured to send optical signals and receive reflections of the optical signals through the first sensing fiber, and
    the second sensing fiber being coupled only to the reflectometer of the second interrogation and laser pumping sub-system at one end opposite from the one end of the first sensing fiber such that the reflectometer of the second interrogation and laser pumping sub-system is configured to send optical signals and receive reflections of the optical signals through the second sensing fiber.

2. The system of claim 1, wherein the first and second sensing fibers include one or more fiber optic amplifier stages along their lengths that are coupled to pump laser fibers of the first and second interrogation and laser pumping sub-systems, respectively.

3. The system of claim 2, wherein each coupling between each of the one or more fiber optic amplifier stages of the first sensing fiber and a pump laser fiber from both the first and second laser pumping sub-system is implemented through an optical demultiplexer.

4. The system of claim 3, wherein the sensor cables are configured to run in parallel to the structure, and are deployed, on either side of the structure, and/or in a same trench as the structure.

5. The system of claim 1, wherein the linear structure includes one of a pipeline structure, a railway structure, a border structure, and a power cable structure.

6. The system of claim 1, wherein the reflectometers of the system are Brillouin optical time domain reflectometers.

7. An optical fiber sensor system for monitoring a condition of a linear structure, the system comprising:
    a sensor cable comprising first and second sensing fibers provided along the length of the linear structure and decoupled from each other, the first and second sensing fibers each including one or more fiber optic amplifier stages along its length, and
    first and second interrogation and laser pumping sub-systems disposed at opposite ends of the sensor cable, each of which includes a reflectometer and pump laser fibers,
    the first sensing fiber and the one or more fiber optic amplifier stages being coupled only to the reflectometer and the pump laser fibers of the first interrogation and laser pumping sub-system at one end, respectively, such that the reflectometer of the first interrogation and laser pumping sub-system is configured to send optical signals and receive reflections of the optical signals through the first sensing fiber, and
    the second sending fiber and the one or more fiber optic amplifier stages being coupled only to the reflectometer and the pump laser fibers of the second interrogation and laser pumping sub-system at one end opposite from the one end of the first sensing fiber such that the reflectometer of the second interrogation and laser pumping sub-system is configured to send optical signals and receive reflections of the optical signals through the second sending fiber and the reflectometers of the first and second interrogation and laser pumping sub-systems redundantly monitor the length of the sensor cable.

8. A method for monitoring a length of a linear structure with an optical fiber sensor system comprising the steps of:
    providing a sensor cable comprising first and second sensing fibers along the length of the linear structure with the first and second sensing fibers decoupled from each other,
    transmitting optical signals and receiving reflections of the optical signals through one end of the first sensing fiber with a first interrogation and laser pumping sub-system coupled only to the one end of the first sensing fiber; and
    transmitting optical signals and receiving reflections of the optical signals through one end of a second sensing fiber that is opposite from the one end of the first sensing fiber with a second interrogation and laser pumping sub-system coupled only to the one end of the second sensing fiber.

* * * * *

UNITED STATES PATENT AND TRADEMARK OFFICE
CERTIFICATE OF CORRECTION

PATENT NO. : 9,784,642 B2  
APPLICATION NO. : 13/119231  
DATED : October 10, 2017  
INVENTOR(S) : Andrew Strong et al.

Page 1 of 1

It is certified that error appears in the above-identified patent and that said Letters Patent is hereby corrected as shown below:

On the Title Page

(73) Assignee:  
Replace "OneSubsea IP UK Limited, London (GB)"  
With --Schlumberger Technology Corporation, Sugar Land, TX (US)--

Signed and Sealed this  
Sixteenth Day of November, 2021

Drew Hirshfeld  
*Performing the Functions and Duties of the*  
*Under Secretary of Commerce for Intellectual Property and*  
*Director of the United States Patent and Trademark Office*